(12) United States Patent
Bradish

(10) Patent No.: US 9,749,849 B1
(45) Date of Patent: Aug. 29, 2017

(54) SYSTEMS AND METHODS FOR ASSOCIATING USER PERSONAL INFORMATION WITH WIRELESS ENABLED DEVICES

(71) Applicant: WIRELESS REGISTRY, INC., Washington, DC (US)

(72) Inventor: Stillman Bradish, Washington, DC (US)

(73) Assignee: The Wireless Registry, Inc., Washington, DC (US)

( * ) Notice: Subject to any disclaimer, the term of this patent is extended or adjusted under 35 U.S.C. 154(b) by 94 days.

(21) Appl. No.: 14/614,723

(22) Filed: Feb. 5, 2015

Related U.S. Application Data

(60) Provisional application No. 61/938,887, filed on Feb. 12, 2014.

(51) Int. Cl.
| | | |
|---|---|---|
| *G06F 15/16* | (2006.01) | |
| *H04W 8/24* | (2009.01) | |
| *H04L 29/08* | (2006.01) | |
| *H04W 76/02* | (2009.01) | |
| *G06F 17/30* | (2006.01) | |

(52) U.S. Cl.
CPC ...... *H04W 8/245* (2013.01); *G06F 17/30876* (2013.01); *H04L 67/025* (2013.01); *H04L 67/303* (2013.01); *H04W 76/021* (2013.01)

(58) Field of Classification Search
CPC .. H04W 8/245; H04W 76/021; H04L 67/025; H04L 67/303; G06F 17/30876
See application file for complete search history.

(56) References Cited

U.S. PATENT DOCUMENTS

| | | | | |
|---|---|---|---|---|
| 9,479,488 | B2 * | 10/2016 | Tseng | H04L 63/08 |
| 2010/0275249 | A1 * | 10/2010 | McCann | H04L 63/08 726/5 |
| 2011/0167478 | A1 * | 7/2011 | Krishnaswamy | H04L 47/10 726/4 |
| 2013/0111554 | A1 * | 5/2013 | Sposato | H04L 63/20 726/4 |
| 2013/0333016 | A1 * | 12/2013 | Coughlin | H04W 12/06 726/9 |
| 2015/0106184 | A1 * | 4/2015 | Tanaka | G06Q 30/0207 705/14.26 |

\* cited by examiner

*Primary Examiner* — Krisna Lim
(74) *Attorney, Agent, or Firm* — Eric L. Sophir; Dentons US LLP

(57) ABSTRACT

A system and methods for storing and associating wireless enabled devices with personal information from their users are disclosed. The system may include a registry for storing the wireless enabled devices unique identifiers and their associated personal information. The system may also include methods for delivering content or triggering actions by identifying a user within range of a wireless access point. The user may be identified by a wireless enabled device unique identifier included in a probe message broadcast by the wireless enabled device and received by a wireless access point.

5 Claims, 4 Drawing Sheets

SYSTEMS AND METHODS FOR ASSOCIATING USER PERSONAL INFORMATION WITH WIRELESS ENABLED DEVICES

CROSS-REFERENCE TO RELATED APPLICATION

This non-provisional patent application claims priority to U.S. Provisional Patent Application No. 61/938,887, entitled "Systems and Methods for Associating User Personal Information with Wireless Enabled Devices," filed Feb. 12, 2014, which is incorporated by reference herein in its entirety.

TECHNICAL FIELD

The present disclosure relates in general to wireless networking, and more specifically to providing content in a wireless enabled device by associating a unique identifier of the device with personal information from the user of the device.

BACKGROUND

Wireless Enabled Devices (WEDs) have seen increasingly widespread use in recent years as consumers have shown a growing interest in accessing content wirelessly. Consumers may use phones, tablets, laptops, and many other devices in a variety of environments and situations, and as the number of users may grow so may the challenges faced in providing a suitable service to each user.

Because of the widespread use of wireless enabled devices many businesses now offer access points at their locations. For example, coffee shops, such as Starbucks, may offer access points in order for customers to be able to connect to the internet. Businesses also offer applications that a user may use to obtain access to services, promotions, advertisements, purchases etc. For example a train station may offer an application that delivers train arrival and departure schedules to a user.

At times, parties may be unaware of information on promotions or services offered by a business. However, due to different business offering these access points an opportunity exist for these businesses to deliver specific information or content to the parties within range of the access points.

Thus, a need exists for a system and method for dynamically delivering specific information or content to WEDs within the range of the access point.

SUMMARY

Systems and methods for associating and managing network information strings are disclosed. According to an embodiment, a wireless network system may include one or more wireless enabled devices (WEDs) which may receive a broadcast a beacon message or probe message, where this beacon or probe message may include a network information string as well as a unique identifier for the device, user, application, or data object, such as a MAC address for the computing device. The system may further include an information string server operatively coupled with an application programming interface (API); and a registry which may include a wireless name system (WNS) for storing network information strings, a wireless name associator (WNA) for storing associated content, a wireless enabled devices associator (WEDA) for storing associated devices with personal information, and a log datastore for storing API logs.

In one embodiment, a computer-implemented method comprises receiving, by a information string server computer, from a wireless access point a wireless identifier associated with a wireless device; determining, by the computer, whether a record of the wireless identifier is stored in a registry database; determining, by the computer, whether the record of the wireless identifier contains personal data describing a user associated with the wireless identifier; and executing, by the computer, executing one or more software applications using the personal data of the user, in response to identifying the record of the wireless identifier containing the personal data of the user.

Additional features and advantages can become apparent from the detailed descriptions which follow, taken in conjunction with the accompanying drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
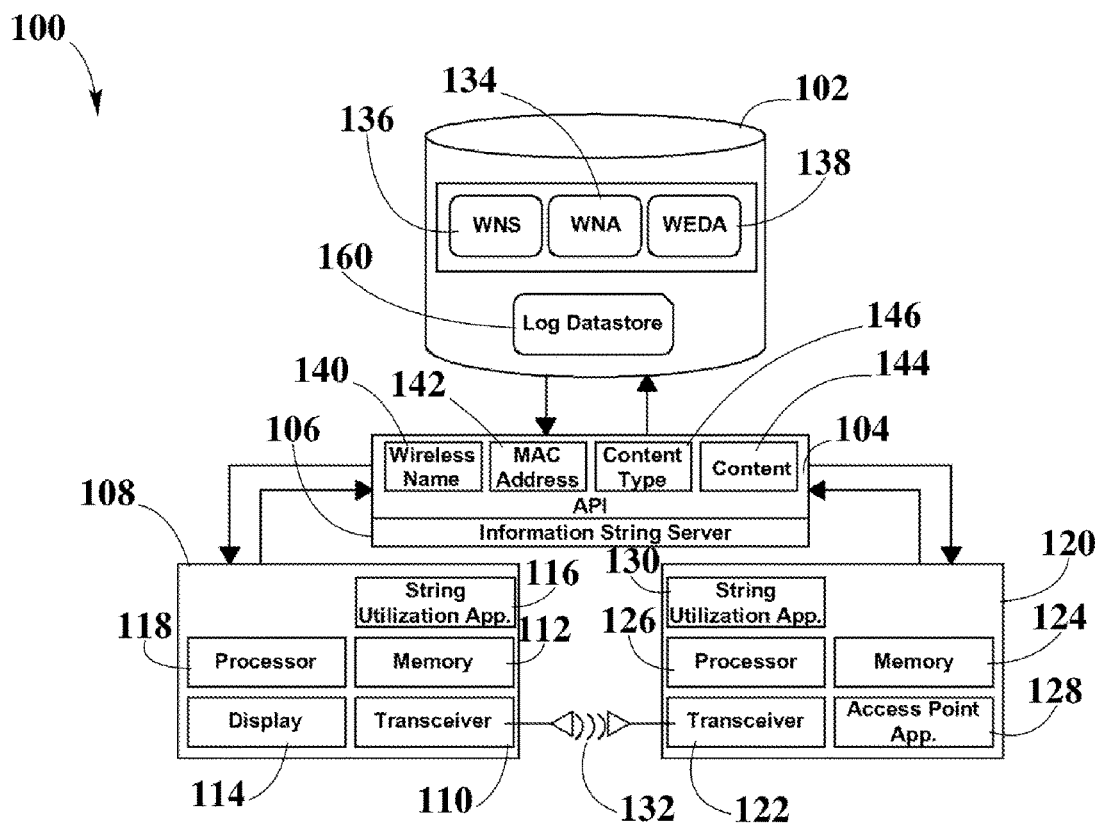
FIG. 1 illustrates a block diagram of a wireless network system for managing content exchange in wireless networks.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Registry" refers to any component in a system suitable for storing at least one type of information about one or more of the other components of the system and/or one or more users of the system.

"Wireless Enabled Device", or "WED" refers to any electronic device able to communicate using one or more suitable wireless technologies. Suitable devices may include client devices in wireless networks, which may send out wireless probe signals in order to detect known Access Points. These may be part of one or more suitable wireless technologies, including Wi-Fi, amongst many others.

"Access Point" refers to any device capable of establishing a connection between one or more suitable WEDs within a suitable spatial range and one or more suitable networks.

"SSID" refers to any identifier suitable for allowing the identification of a wireless network.

"Beacon message" refers to a signal transmitted by an access point, which signal conveys a message that identifies the network and provides information about the network, including information to allow a wireless enabled device to join the network.

"Probe Message" refers to a signal transmitted by a wireless enabled device that may be received by a wireless access point, which signal conveys a message that identifies the wireless enabled device and request information about a particular wireless network or all wireless networks within range of the wireless enabled device.

"Network Information String" refers to a string message included in a beacon message or a probe message.

The present disclosure describes systems and methods related to wireless network management. Embodiments may include various combinations of Authorized Device Specific SSIDs, Access Point Managers, Registry databases, and Wireless Enabled Devices (WEDs).

Although the embodiments described herein make reference to Wi-Fi (802.11) communication protocols and information exchanges, it should be appreciated that in other embodiments any wireless communication technology (i.e., hardware, software, and protocols) may be implemented. Suitable access point hardware may be able to broadcast multiple network information strings, where each network information string may be either publicly broadcast or may be hidden. Multiple network information strings being broadcast by one or more access points may form one or more virtual access points (VAPs) perceivable by WEDs in range of the access point. If the network information string of the VAP and its associated credentials may match an network information string and a credential-pair that was previously stored by the WED, the WED may attempt to establish a connection to the VAP. The access point may use a wireless signal or technology of any type, such as virtual local area network (VLAN), Bluetooth, Wi-Fi, WiMax, SuperWiFi, LTE systems, LTE Direct, Wi-Fi Direct, or any other wireless signal or technology. Wireless technologies involved in these applications may be any technology that may wirelessly transmit name strings and wirelessly transmit wireless IDs of any kind (e.g., LTE Direct Expressions and LTE, Universal Unique Identifier (UUID), Hardware ID, SSID and MAC). A person having ordinary skill in the art would appreciate that the terms SSID and MAC, as used herein, may be understood as including other wireless technologies (e.g., Bluetooth® names, LTE-Direct Expressions, etc.). Likewise, suitable WED hardware may be able to use a wireless signal or technology of any type, such as Bluetooth®, Wi-Fi, WiMax, SuperWiFi, LTE systems, LTE Direct, Wi-Fi Direct, or any other wireless signal or technology. Wireless technologies involved in these applications may be any technology that may wirelessly transmit name strings and wirelessly transmit wireless IDs of any kind (e.g., LTE Direct Expressions and LTE Hardware ID, SSID and MAC).

As an example, in one embodiment, a wireless enabled device (WED) may broadcast a probe message that may be received by a wireless access point. This wireless access point may send a message to an information string server in order to determine if any personal information may be associated with the specific wireless enabled device. The information string server may use personal information to determine specific content that may be delivered to the wireless enabled device. In some embodiments, a network information string may encompass all or part of the network identifier broadcast by the wireless access point or wireless enabled device, such as for example service set identifier (SSID) of a Wi-Fi network, the MAC address of the wireless access point or of the wireless enabled device or combinations thereof.

FIG. 1 is a block diagram of a wireless ID system 100 for managing the acquisition content of one or more wireless enabled devices (WED) through the exchange of network information strings in a wireless network, according to an embodiment.

System 100 may include a registry 102; an application programming interface API 104 integrated within an information string server 106; at least one WED 108 connected through a network with information string server 106.

WED 108 may include a transceiver 110, a memory 112, a display 114, a string utilization application 116, and a processor 118. By a way of illustration and not by way of limitation, connected WED 108 may include cell phones, smartphones, access points, tablet computers, desktop computers, banking terminals, cash register and the like.

Similarly, a wireless access point 120 may include a transceiver 122, a memory 124, a processor 126, an access point application 128, and a string utilization application 130. The access point application 128 may provide instructions to processor 126 to at least enable wireless access point 120 to transmit a beacon message 132. Wireless access point 120 may also include a display (not shown). The wireless access point 120 may enable a Wi-Fi network where WED 108 may establish a connection.

Beacon message 132 may include a network information string, which may include in part a service set identifier (SSID) that may be associated with content stored in registry 102. Specifically, the SSID may be associated with content stored in a wireless name associator WNA 134, while the network information string may be stored or registered in a wireless name system WNS 136. The network information string stored in WNS 136 may include all or a portion of a SSID of a Wi-Fi network, the MAC address broadcast by Wireless access point 120, and/or authentication codes embedded in the SSID. Content stored in WNA 134 may include pictures, videos, announcements, menus, news alerts, directions or links associated with the network information string stored in WNS 136. An additional a wireless enabled device associator WEDA 138 may store associations of the unique identifiers of WED 108 with personal information and preferences from their users.

A WED 108 may receive one or more beacon messages 132 broadcast from one or more wireless access points 120 or other WEDs 108 (not shown). String utilization application 116 from WED 108 may check for content stored in memory 112 that may be associated to the network information string in beacon message 132.

If the content is not found in memory 112, WED 108 may send a query for content retrieval to information string server 106 via a network connection. Alternatively, a WED 108 may send a query for content retrieval without first checking for content in memory 112. The query may also include authentication information, such as, username and password, in order to determine access rights of the WED 108 to the content associated to the network information string.

A command code which may enable an action to be performed in a WED 108 may also be stored in WNA 134 and associated with a network information string. A command code may be associated with a unique identifier of the wireless network, such as an SSID or a MAC address for a specific device such as a WED 108 or a wireless access point 120. A WED 108 may check through the information string server 106 if any available command codes for a network information string or a specific MAC address exist in WNA 134 and may download and store those command codes in memory 112.

According to an embodiment, information string server 106 may process one or more queries through API 104. This API 104 may manage the operation of information string server 106 and its interaction with registry 102. API 104 may include different modules for processing one or more queries. For example, API 104 may process a query based on the wireless name 140 or SSID and MAC address 142 included in the network information string. In another embodiment, API 104 may process a query based on the content 144 and content type 146 that may be returned to a WED 108. Yet in another embodiment, API 104 may include another module (not shown) for processing authentication codes embedded in SSIDs.

API 104 may perform a comparison between the SSID and/or MAC address included in the network information string transmitted through beacon message 132. Specifically, API 104 may compare the SSID and MAC addresses included in the network information string against a list of SSIDs and MAC addresses stored in registry 102. If the SSID and/or the MAC address in network information string are stored or were previously registered, then API 104 may search for content in WNA 134 associated with the SSID and/or MAC address transmitted by WED 108 or Wireless Access point 120. API 104 may retrieve the associated content from WNS 136 and may output this content back to WED 108. The content returned to the WED 108 may provide information such as videos, pictures, messages, advertisement, links to websites and/or any related content to the provider of the Wireless access point 120 sent the beacon message 132.

During this operation, information about queries for content retrieval may be stored in a log datastore 160. Content stored in log datastore 160 may include information of the interaction between a wireless access points 120 and the different WED 108; time and date of each interaction of a Wireless access point 120 with each WED 108; content and/or content type queried or returned; and the location of WED 108 and/or Wireless access point 120 when the query for content retrieval was made.

In an embodiment, information captured in log datastore 160 may allow the identification of patterns of action of one or more WED 108, or one or more wireless access points 120, or their respective users. In another embodiment, information captured in log datastore 160 may identify user preferences, determine the response of user of WED 108 to the content associated with the network information string, and measure the interest of the user of WED 108 in the different types of content. Yet in another embodiment, the information captured in log datastore 160 may allow the association of one or more WEDs 108 or one or more wireless access points 120 to one or more patterns of action without requiring registration at the WNS 136.

In a further embodiment, information stored in log datastore 160 may provide statistics about the usage of SSIDs and MAC addresses of WED 108 or wireless access points 120. For example, an owner of a Wireless access point 120 may log in to API 104 and registry 102, and may obtain information about when (time and date) and where (location) the MAC address or SSID of a WED 108 may have been detected or checked within a specific period of time, i.e. last month. The log datastore 160 may also provide information about the content that has been associated with a particular SSID or MAC address, and may further provide trends and statistical reports.

In a further embodiment, a WED 108 may broadcast a probe message that may be received by other WED 108 or Wireless access points 120. The probe message may include a network information string, which may in turn include the MAC address of the WED 108. The MAC address of the device may in turn be pinned or associated with personal information of the user which may have been previously registered. The personal information and MAC address of the device as well as any personal preferences from the user may be stored and associated together in registry 102 as part of the WEDA 138 data store. Examples of personal information may include, first name and last name of the user, date of birth, email, phone number. In another embodiment, a MAC address of the WED 108 may be pinned to social media profiles from the user such as, a Facebook profiles or LinkedIn profiles.

By a way of illustration and not by way of limitation, patterns of action may include movement or behavior patterns of WEDs 108 based on location information registered in log datastore 160 for wireless access point 120, as well as shopping or consumer tendencies, among others.

In general, the utilization of log datastore 160 may be managed by API 104 according to the application.

Figure 2:
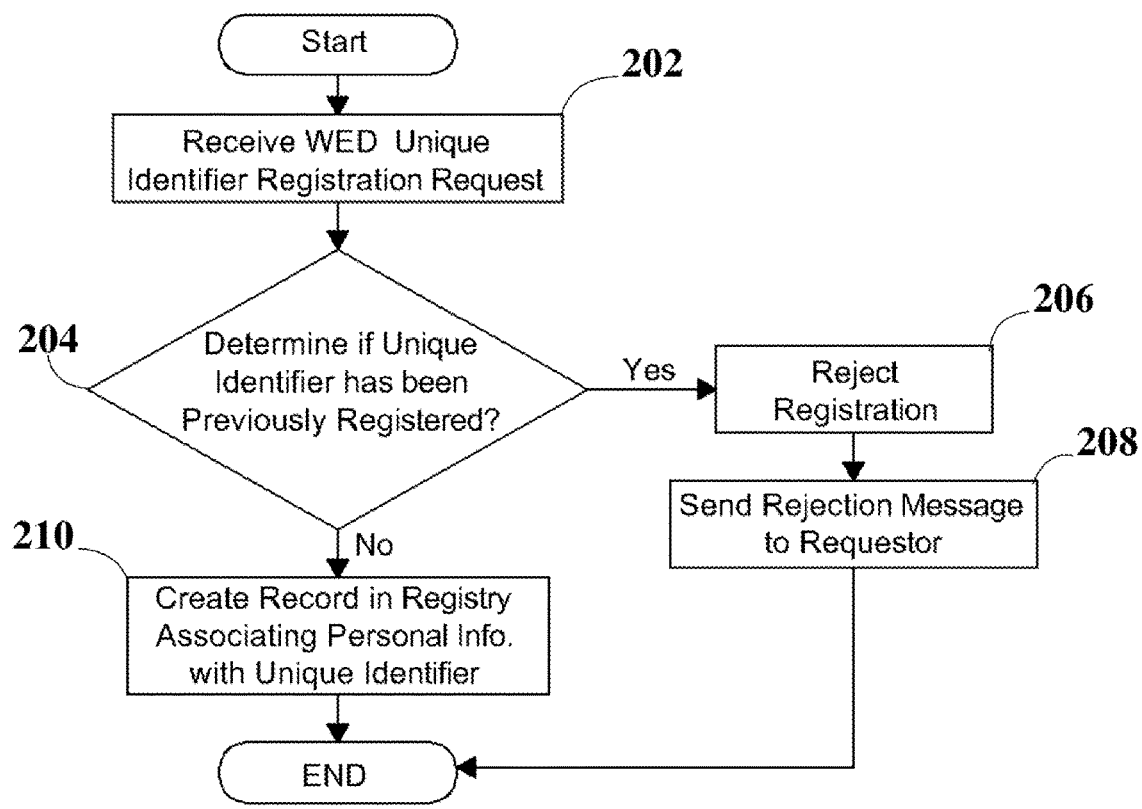
FIG. 2 is a flowchart of a process to register a wireless enabled device and associate it with personal information from the user.

FIG. 2 is a flow diagram illustrating a process by which a user requests registration of a unique wireless identifier and personal information in an information string server.

In this embodiment, a WED unique identifier registration request may be received at an information string server (block 202). The information string server may then compare the WED unique identifier in the request against unique identifiers previously registered to determine if the WED has already been stored and associated with personal information (block 204).

If the unique identifier has been previously registered, the registration request is rejected (block 206). A message is sent advising the requestor that the registration request may have been rejected (block 208). If the unique identifier has not been previously registered the registration request may be granted. A record may be created in the registry of information string server associating the personal information of the user with the WED unique identifier (block 210). Examples of personal information may include without limitation first name, last name, date of birth, email, phone number among others. The user may also allow the system to access the user's information from a user profile such as a social network (Facebook, Twitter, LinkedIn, etc.).

In another embodiment, the user may also request to change the previously registered personal information with the WED unique identifier. For example, a user may decide to change the email or phone number associated with their WED unique identifier in the network information string.

Figure 3:
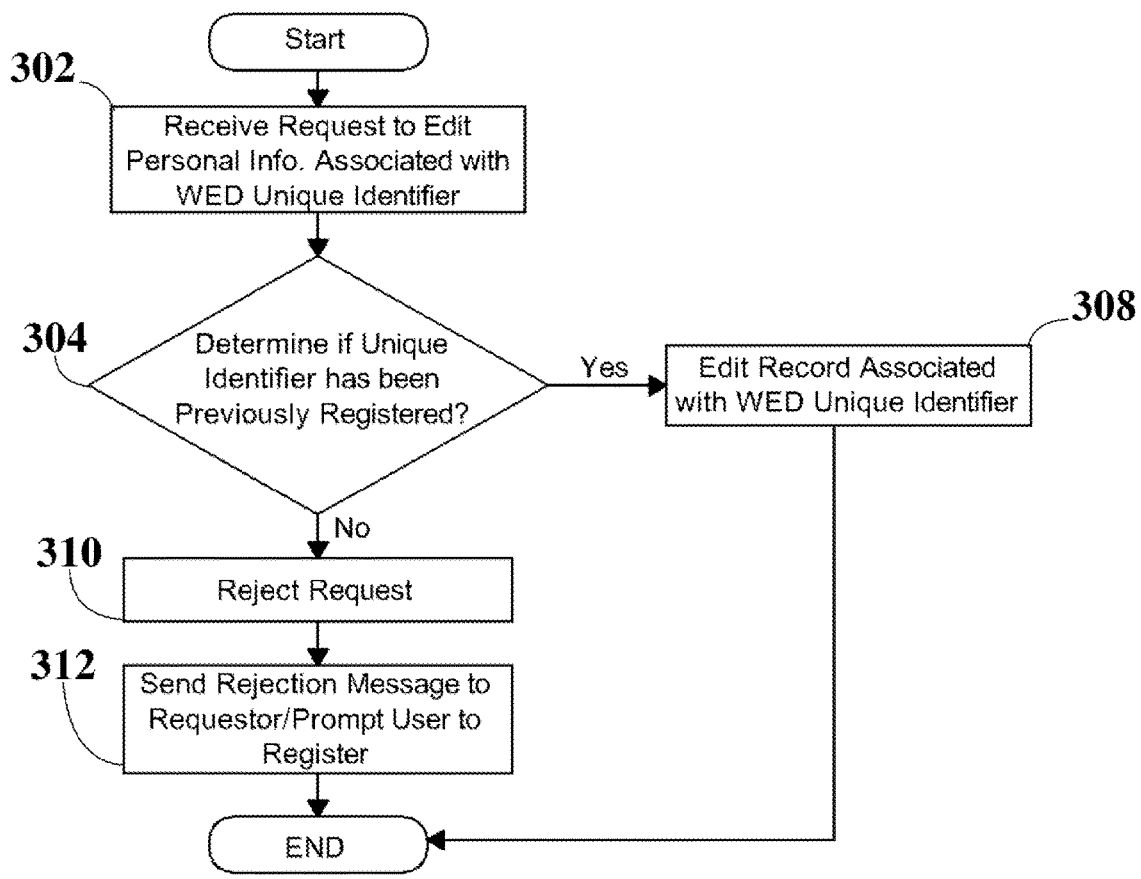
FIG. 3 is a flowchart of a process to edit personal information associated with a wireless enabled device in a system for managing content exchange in wireless networks.

FIG. 3 is a flow diagram illustrating a process by which a user request to change previously associated personal information with a WED unique identifier.

In this embodiment, a request to edit personal information associated with a WED unique identifier may be received at an information string server (block 302). The information string server may then compare the WED unique identifier in the request against the WED unique identifiers previously registered in order to identify the personal information associated with the WED unique identifier (block 304). If the unique identifier has been previously registered, the network information string may then proceed to change the personal information on the record associated with the WED unique identifier (block 308). If the unique identifier has not been previously registered the request to edit the associated personal information may be rejected (block 310). A message may be sent advising the requestor that the request may have been rejected (block 312). The message may also prompt the user to register and associate personal information with the unique identifier of the WED.

Figure 4:
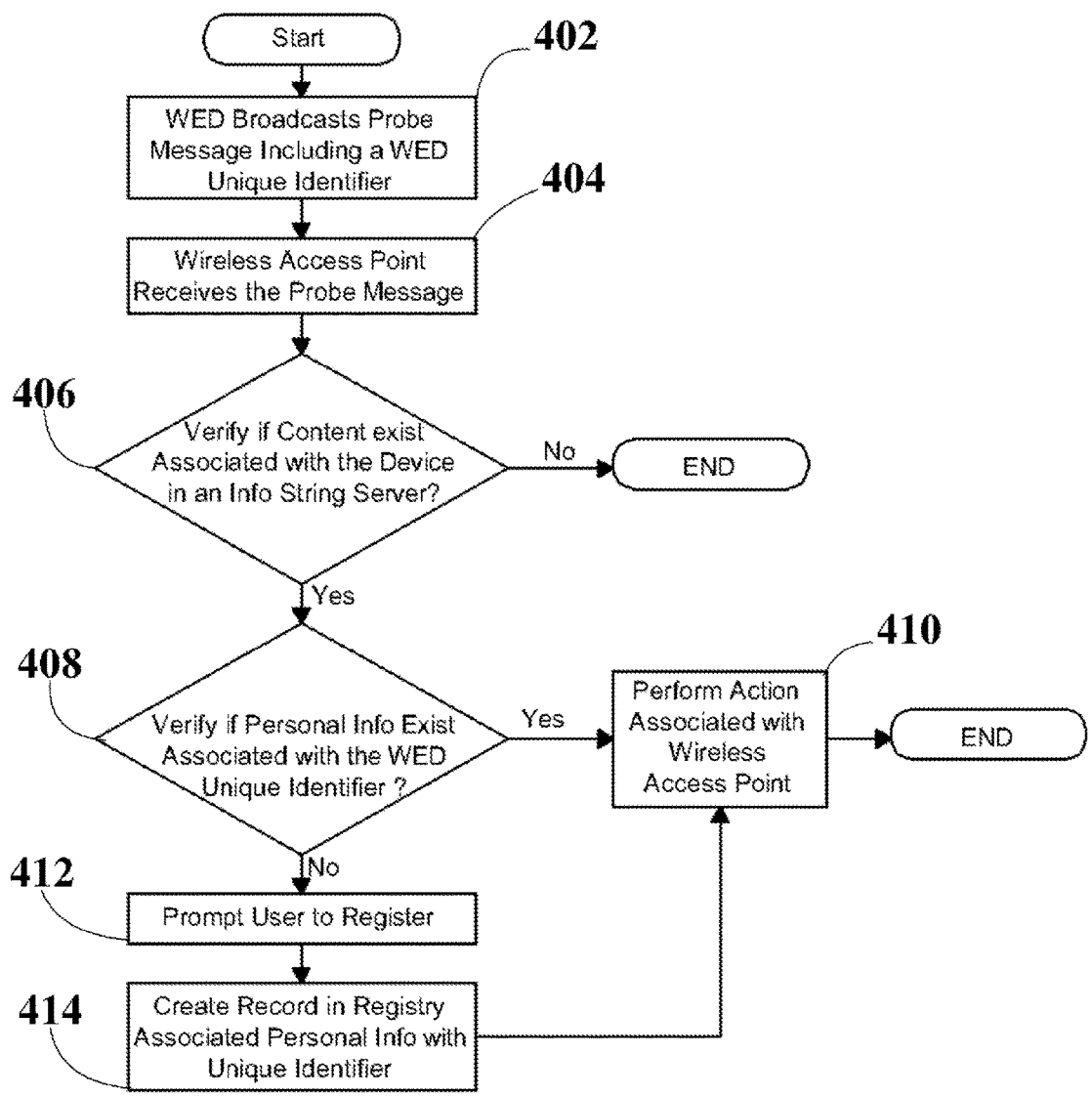
FIG. 4 is a flowchart of a process for performing actions or delivering content in a wireless enabled device.

FIG. 4 is a flow diagram illustrating a process by which a user is prompted to register a WED unique identifier with the user's personal information when the WED is within range of a wireless access point.

In an embodiment, a WED, such as for example and without limitation a smartphone, broadcasts a probe message (block 402) which may be received by a wireless access point (block 404). The probe message may include a network information string which in turn may include a unique identifier for the WED, such as, for example, and without limitation a MAC address. The wireless access point may then verify with an information string server if any content exists associated with the WED unique identifier (block 406). If no content exist associated with the unique identifier, the process may end.

If content exists in the network information string, a determination is made to verify if any personal information of the user is associated in the registry with that unique identifier (block 408). Examples of personal information may include, without limitation, first name, last name, date of birth, email, phone number among others.

If personal information already exists in the registry the process may continue to perform any actions requested by the wireless access point, such as retrieve content, log information, perform actions, etc. (block 410). For example, a user of a WED may have associated the MAC address of their smartphone with their personal email in the registry, as the MAC address from the device is detected within range of wireless access point at a restaurant the restaurant may retrieve the email from the registry and send the user an email with a coupon for a discount at the restaurant.

In another embodiment, personal information from a user of a WED within a wireless access point may be used for statistical purposes. For example, each time a user with their name associated to their WED is within range of a wireless access point a record may be saved in a log data store.

If no personal information exists associated with the unique identifier of the WED the user may be prompted to provide personal information (block 412). The user may then provide personal information or may allow the system to access user information from a user profile such as a social network (Facebook, Twitter, LinkedIn, etc.). A record in the registry may be created associating user information with the unique identifier (block 414). The user may also choose not to provide any personal information or deny access to personal profile (block 412). After the user has provided or denied personal information the process may continue to perform any actions requested by the wireless access point (block 410).

Example #1 is a scenario where a user is identified by their WED and a promotional code is sent to their email. A wireless network management system may include components similar to those used in FIG. 1. Following a method such as the one described in FIG. 4, a user of wireless smart phone is within range of a wireless access point located at a shop store. The WED broadcasts a probe message including network string and a unique identifier for the device. The wireless access point receives the probe message and a request is sent to the information string server in order to retrieve any personal information associated with the WED. The request may return the email of the user. Content associated with the wireless access point may include, coupon discounts or promotions. The system may then send the coupons or promotions to the email associated with the WED.

Example #2 is a scenario where a WED is associated to a user profile of a social network such as, for example and without limitation Facebook. A wireless network management system may include components similar to those used in FIG. 1. Following a method such as the one described in FIG. 4, a user of wireless smartphone is within range of a wireless access point located at a restaurant. The smartphone broadcasts a probe message including network string and a unique identifier for the device. The wireless access point receives the probe message and a request is sent to the information string server in order to retrieve any personal information associated with the smartphone. The request may grant access to the user's social profile. The smartphone may include an application that notifies the user when a friend on Facebook is nearby. A second user of WED may enter the restaurant. The second WED may broadcast a probe message including network string and a unique identifier for the device. The wireless access point receives the probe message and a request is sent to the information string server in order to retrieve any personal information associated with the WED. The request may grant access to the user's social profile. Both users may be friends on Facebook and the smartphone application of the first user may then notify them that his friend is within the same wireless access point.

The exemplary embodiments can include one or more computer programs that embody the functions described herein and illustrated in the appended diagrams. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "detecting" or "connecting" or "sending" or "determining" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    receiving, by an information string server computer, from a wireless access point a wireless identifier associated with a wireless device, wherein the wireless identifier identifies networking information of the wireless device;
    determining, by the information string server computer, whether a record of the wireless identifier is stored in a registry database on the information string server computer;
    determining, by the information string server computer, whether the record of the wireless identifier contains personal data describing a user associated with the wireless identifier, wherein the personal data includes at least one of the user's first name, the user's last name, the user's date of birth, the user's email, and the user's phone number; and
    executing, by the information string server computer, one or more software applications by using the personal data of the user, in response to identifying that the record of the wireless identifier does contain the personal data of the user.

2. The method according to claim 1, wherein the record of the wireless identifier comprises a data field containing an indication of a software application to execute when the computer receives the wireless identifier from at least one wireless access point.

3. The method according to claim 2, further comprising:
    receiving, by the computer, the indication of the software application to execute; and
    storing, by the computer, into the registry database the indication of the software application to execute, wherein the indication is stored into the record of the wireless identifier associated with the user.

4. The method according to claim 1, wherein a software application in the one or more software applications is selected from the group consisting of: a web browser, a social network application, and a wireless device configurations application.

5. The method according to claim 1, further comprising generating, by the computer, a new record for the wireless identifier in response to determining the one or more records of the registry database is not for the wireless identifier; and
    storing, by the computer, into one or more data fields of the record personal data associated.

* * * * *